(12) United States Patent
Ogilvie

(10) Patent No.: US 7,882,097 B1
(45) Date of Patent: *Feb. 1, 2011

(54) SEARCH TOOLS AND TECHNIQUES

(76) Inventor: John W. Ogilvie, 1320 Laird Ave., Salt Lake City, UT (US) 84105

( * ) Notice: Subject to any disclaimer, the term of this patent is extended or adjusted under 35 U.S.C. 154(b) by 319 days.

This patent is subject to a terminal disclaimer.

(21) Appl. No.: 12/030,179

(22) Filed: Feb. 12, 2008

Related U.S. Application Data

(63) Continuation of application No. 11/235,457, filed on Sep. 26, 2005, now abandoned.

(60) Provisional application No. 60/614,736, filed on Sep. 30, 2004.

(51) Int. Cl.
  *G06F 7/00* (2006.01)
  *G06F 15/16* (2006.01)
(52) U.S. Cl. .................. 707/706; 707/707; 709/245
(58) Field of Classification Search ............ 707/3, 707/706, 707; 709/245
See application file for complete search history.

(56) References Cited

U.S. PATENT DOCUMENTS

| | | | |
|---|---|---|---|
| 6,732,088 B1 | 5/2004 | Glance | |
| 6,985,896 B1 * | 1/2006 | Perttunen ........................... | 1/1 |
| 2001/0000359 A1 * | 4/2001 | Schreiber et al. ............ | 713/201 |
| 2002/0161752 A1 | 10/2002 | Hutchison | |
| 2003/0208624 A1 * | 11/2003 | Grossman ................... | 709/245 |
| 2003/0212663 A1 | 11/2003 | Leno et al. | |
| 2005/0071255 A1 | 3/2005 | Wang et al. | |
| 2005/0154716 A1 | 7/2005 | Watson et al. | |
| 2008/0010281 A1 | 1/2008 | Berkhin et al. | |

OTHER PUBLICATIONS

U.S. Appl. No. 11/938,338, Ogilvie.
U.S. Appl. No. 11/235,457, Ogilvie.
Angkawattanawit et al., "Learnable Crawling: An Efficient Approach to Topic-Specific Web Resource Discovery", 2002.
Novak, "A Survey of Focused Web Crawling Algorithms".
"Relevance" entry from FOLDOC, 1997.
Zwicky, "A Way for Search Engines to Improve", Mar. 23, 2004.
Houston, "The Evolution of Search", 2005.
Pages from www.humwin.com discussing "Baynote's patent-pending UseRank technology", no later than Jun. 16, 2006.

\* cited by examiner

*Primary Examiner*—Etienne P LeRoux
*Assistant Examiner*—Cindy Nguyen
(74) *Attorney, Agent, or Firm*—Ogilvie Law Firm

(57) ABSTRACT

The invention provides tools and techniques for assisting searches of large information collections, such as the Internet or databases. An initial search from a given user A is used to help identify related productive searches by other users. Those searches (keywords and/or searched portions) are then used to focus the search effort of user A. Activities by other users in response to search results are tracked to help a search assistant automatically identify the results those other users deemed of greatest interest.

14 Claims, 1 Drawing Sheet

SEARCH TOOLS AND TECHNIQUES

RELATED APPLICATIONS

The present application is a continuation of U.S. application Ser. No. 11/235,457 filed Sep. 26, 2005 now abandoned, which incorporates by reference, and claims priority to, U.S. provisional patent application Ser. No. 60/614,736 filed Sep. 30, 2004. The present application is thus a sibling of U.S. application Ser. No. 11/938,338 filed Nov. 12, 2007, which is also a continuation of U.S. application Ser. No. 11/235,457 filed Sep. 26, 2005.

FIELD OF THE INVENTION

The present invention relates generally to tools and techniques for searching large collections of information, such as databases and/or the Internet.

BACKGROUND

Well-known search tools include keyword-search interfaces such as those providing access to the United States Patent and Trademark database of patents and patent applications at the USPTO web site; those provided by search engine sites such as the Google site, the Yahoo! Site, and others; and variations on these such as those using a voice interface. Increasing information accessibility is a continuing and important effort to which the present invention may contribute.

SUMMARY OF INVENTION

The present invention provides search tools and techniques, which may be embodied in various forms such as methods, systems, products of processes, configured storage media, computer data structures, and the like. Unless otherwise stated, discussion of one form of embodiment illustrates but does not necessarily limit other forms of embodiment. For instance, discussion of methods of the invention illustrate systems of the invention, which may include computers configured to operate according to the methods, without necessarily requiring that the systems include every limitation discussed in connection with the methods. Likewise, the discussion of systems illustrates methods without necessarily limiting the methods, and so on, for each form of embodiment. For more information, please refer to the claims.

DRAWINGS

To illustrate the manner in which the advantages and features of the invention are obtained, a more particular description of the invention will be given with reference to the attached drawings. These drawings only illustrate selected aspects of the invention and thus do not fully determine the invention's scope. In the drawings.

DETAILED DESCRIPTION

Figure 1:
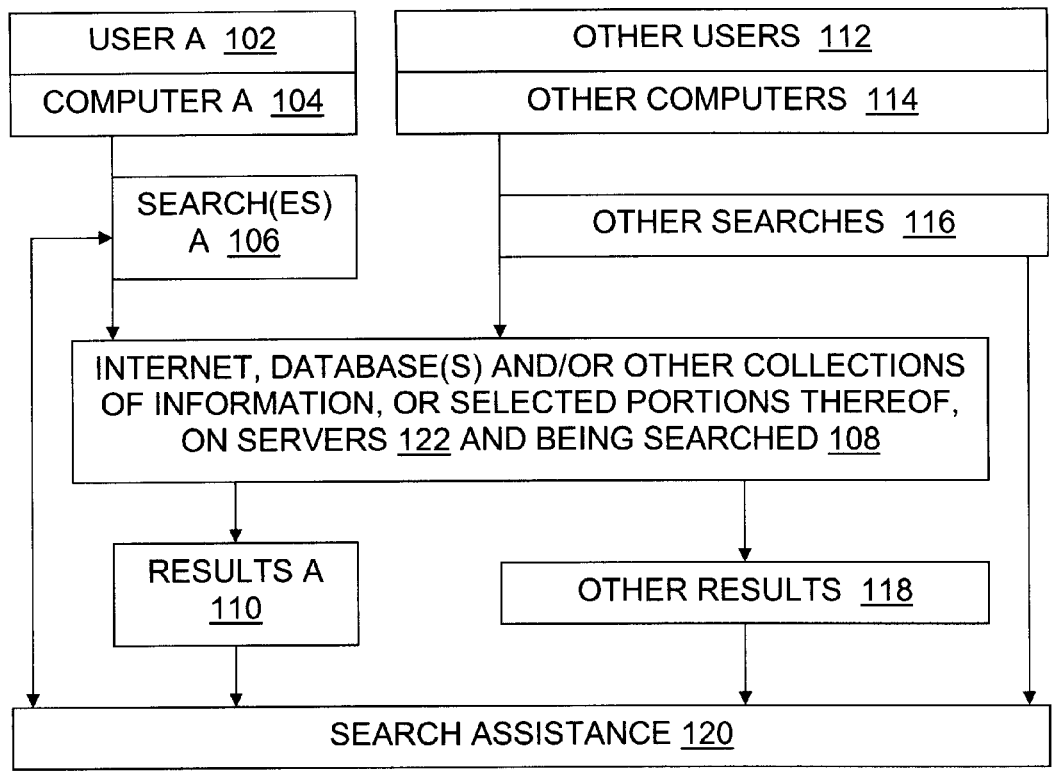
FIG. 1 is a data flow diagram illustrating systems and methods according to the present invention.

Reference is made to exemplary embodiments, and specific language will be used herein to describe the same. But alterations and further modifications of the inventive features illustrated herein, and additional applications of the principles of the invention as illustrated herein, which would occur to one skilled in the relevant art(s) and having possession of this disclosure, should be considered within the scope of the invention.

In describing the invention, the meaning of important terms is clarified, so the claims must be read with careful attention to these clarifications. Specific examples are given to illustrate aspects of the invention, but those of skill in the relevant art(s) will understand that other examples may also fall within the meaning of the terms used, and within the scope of one or more claims. Words used herein do not necessarily have the same meaning they have in everyday usage, or in a particular dictionary or treatise. Terms may be defined, either explicitly or implicitly, here in the Description and/or elsewhere in the application file(s). It is not necessary for every means or aspect identified in a given definition or example to be present or to be utilized in every embodiment of the invention.

Introduction

Through an extension to a Google-like or other search interface, including one embedded in an application such as the Microsoft Word word processor (Google is a mark of Google, Inc.; Microsoft and Word are marks of Microsoft Corp.), search "subwebs" defined by particular criteria instead of searching all available items ("items" are data sources, e.g., web pages, documents, images, etc.). For instance, search subweb(s) may be defined by any one or more of the following criteria:

1. items searched (by this user, or alternately by any user, or alternately by any user in a specified group) within a specified time period, e.g., within last hour, or anytime on Jul. 4, 2002;
2. items whose web address matches a specified regular expression, e.g., wildcards as in "www.foobar.com/199?" or "*.edu", or exclusion as in "not *novell*";
3. items in a chained-search, that is, items in a database having its own search interface that is visible through the searched subweb but whose contents are not necessarily visible in the searched subweb, e.g., ACM Digital library visible through website portal dot acm dot org slash dl.cfm, or USPTO database visible through website www dot uspto dot gov, by automatically keyword searching their underlying database (using their different search syntax as needed—translations between search syntaxes can be largely automated) and returning results;
4. items from a snapshot of earlier versions, e.g., by coordination with the WayBack Machine at website www dot archive dot org slash web slash web.php, for instance, this could be done by automatically keyword searching current snapshot of web pages, automatically selecting URLs from those results, automatically feeding at least one such URL into the WayBack Machine, automatically keyword searching resulting archived pages from earlier web version, and then automatically returning those results to the user (useful, e.g., in case items currently do not exist on web, or are blocked by robots.txt, because maybe they're accessible if we go back to an earlier snapshot of the website);
5. items in a broader context, by expanding search terms heuristically (much more than merely trying terms having same grammatical root), such as e.g., by adding thesaurus-looked-up synonyms or related terms, or such as e.g., by popping up a dictionary after determining by dictionary search that word is ambiguous (e.g., "bat—do you mean 'flying mammal' or 'baseball equipment') and letting user select correct definition and then supplementing/replacing user-supplied initial ambiguous keyword with more focused search terms extracted from or based on dictionary entry selected by user, or such as e.g., by using artificial intelligence/natural language processing concepts of related words to enhance and focus search, e.g., enhance user-provided keyword "emotion" by adding "love, passion, hatred, excitement, anger, feeling, pride, heartfelt" as search terms;

6. only items that have embedded/linked-directly images, e.g., don't give me text-only pages when I'm looking for a picture of Jim Bridger;

7. items matching search terms that match regular expression keywords, e.g., find me pages that have "fingerprint" but not if it's followed by a PGP fingerprint, as in "'fingerprint' not immediately followed by {[0-9,A-Z][0-9,A-Z][blank]}+";

8. items that will not try to install pop-ups, adware, spyware, or other annoying crap (including viruses and Trojans, of course) if I go to that search result (could either exclude these annoying/dangerous result pages from the results shown to the user, or could include them but flag them and warn the user) (could implement this by going to the result page automatically and checking the result before handing that back among the results given to the user).

These search concepts can also be described using claim language. Because claims can be directed to various embodiments, multiple claims could be founded on a particular feature or set of features. To reduce repetition, however, some of the possible claims are summarized below in the form of a claim directed to "generally corresponding embodiments". This claim is shorthand for a set of claims to generally corresponding embodiments. Accordingly, the claims are arranged below in claim sets. For instance, a claim set directed to "Generally corresponding embodiments including doing act one and doing act two" includes the following claims: "A method including the steps of doing act one and doing act two", "A system including at least one device having a processor and a memory, the device(s) configured to perform act one and act two, solely and/or working together", "A computer-readable storage medium configured with data and instructions to cause at least one device having a processor and a memory to perform act one and act two", "A method comprising the steps of storing data defining at least a portion of a web site and providing interactive access over a network to the data, wherein the web site and the access permit performance of act one and act two", and to the extent they make sense, "A data structure having a first field for holding data for performing act one, and having a second field for holding data for performing act two", and "A product produced by a process including act one and act two".

When possible, such claim summaries should also be read to cover different actors. For instance, a method performed by a searching service corresponds to a method performed by a user of that searching service (as when the service sends/receives information that the user receives/sends), so the generally corresponding embodiments include the methods performed by each actor—the method performed by the user and the corresponding method performed by the searching service.

One group of generally corresponding embodiments includes searching the Internet and/or another data repository according to at least one of the following criteria:

searching for items that have been searched within a user-specified time period;

searching for items that reside at an address whose Universal Resource Identifier is identified by string-matching to a regular expression having wildcards and/or exclusion;

searching for items in chained-search databases;

searching for items which are not necessarily present and accessible in the current snapshot by searching a snapshot of earlier versions for the items;

searching for items by expanding search terms heuristically;

searching for items that have embedded and/or linked-directly images, thereby ruling out result pages that do not contain at least an inline image or an image that is only one hyperlink away;

searching for items that match search terms defined by regular expressions;

searching for items that will not try to install pop-ups, adware, spyware, viruses, or trojans.

Search Subwebs Based on Other Users' Searches

Google and other search engines rely heavily on analysis of links, metatext, and/or other information in the documents that are being searched. But in trying to make searches more effective and more efficient, one can only extract so much information from the searched documents. At some point it becomes beneficial to identify and use information from people's use of the documents. By this I mean not merely their use as evident in placing links to/from the documents, but the other uses people make of search results, such as: identifying, reviewing, returning to, printing, and/or following links from, a given document.

Figure 2:
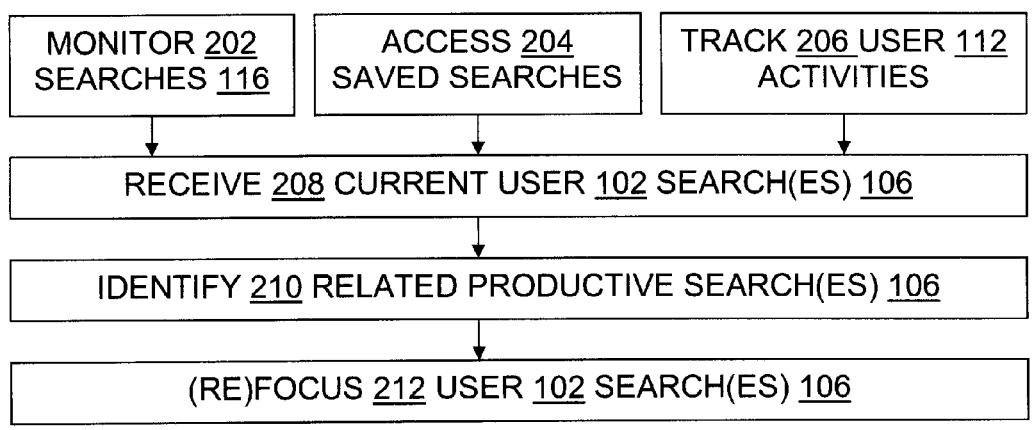
FIG. 2 is a flowchart illustrating methods (a.k.a. processes) of the invention.

In particular, and with regard to FIGS. 1 and 2, some embodiments of the present invention assist a user 102 by leveraging for that user the search expertise of other users 112. This can be done using heuristics or other methods to determine 210 which searches 116 and/or search results 118 of other users 112 are most likely to help the present user 102, and by focusing 212 the present user's search(es) 106 accordingly. As used here, "focusing" means narrowing, refocusing, or both. That is, "focusing" does not imply simply adding limitations; in keyword search terminology it may involve adding OR as well as adding AND, or changing keywords themselves, or both.

In operation, one or more users 112 use one or more computers 114 to formulate one or more searches 116 of at least one large collection 108 of information. "User 112" is used broadly here to mean any one or more persons and/or processes other than user 102. "Computer" (as in "computer 104", "computer 114", a.k.a. "computer device") is used very broadly here to include any device for electronically accessing a database or other large collection, e.g., workstation, laptop, PDA, cell phone, other phone, kiosk, etc. The search 118 produces some result 118 (which may be "no result found matching your search criteria"), which are then normally at least partially displayed (on a screen, through audio production, and/or otherwise) to the user 112. This particular set of activities is familiar.

I believe, however, that automatically leveraging other users' search expertise as described here to focus a given user's search has not been done previously. A search assistance component 120 monitors 202, 206 and/or has access 204 to at least some of these activities and/or results of searchers 112. A search assistance tool 120 leverages those activities to assist user 102.

In some embodiments the search assistance component 120 only monitors 202 and/or accesses 204 searches 116 and their search results 118. In other embodiments, it also monitors/accesses 206 actions by users 112 performed on the computers 114, e.g., it tracks scrolling, following links, opening/closing browsers or other windows, and so on. Such actions by users 112 may imply stronger interest in one search result 118 than in another, which reflection of interest can in turn be used by the search assistant 120 to focus 212 the searches 106 (keywords and/or searched portions) of the user 102.

The search assistant 120 may be implemented in software, configuring and residing on internet/database servers 122 and/or distributed across computers 114, for instance. Special-purpose hardware may also be used in implementing the search assistance module 120. Any combination of hardware and software providing the claimed functionality may be used.

In one scenario, the user 102 formulates an initial keyword search 106 and sends it through computer 104 to the internet 108. This produces results 110, which are not the desired results, due to inaccuracy or incompleteness or both. The search assistant 120 notes 208 the initial search 106, and then finds 210 related productive searches 116 by other users 112. As used herein, "related" and "productive" each have a special meaning explained below. The results 118 of those related productive searches and/or the related productive searches 116 themselves, are then used by the search assistant to focus 212 (possibly iteratively) the search effort of user 102.

Some of the criteria for identifying 210 productive searches by others 112 include, for instance, identifying searches by other users that do one or more of the following:

(a) end with a click on a key word, e.g., on a Google AdWords advertisement, especially if purchases follow (software 120 can track 206 clicks and purchase "conversions" and use it to identify productive search terms and/or good search results for a given search or group of related (e.g., shared keyword) searches);

(b) end with a document being displayed and read (tool 120 checks 206 the display time document is on a screen of computer 114 and/or checks 206 for scrolling by users 112 to get to the part of the search result document that is not initially displayed);

(c) return multiple times to a particular search result document 118 (that document may contain helpful leads, in the form of links and/or other content; in particular the tool 120 may watch 106 for instances of multiple browsers spawned on the computer 114 after the document is displayed there, in conjunction with redisplay of the document, as in a depth-first search by user 112 rooted at the document);

(d) lead to one search result site 118 where there is—relative to the other activity of the user 112 in question and/or other users 112 led to the site—a lot of activity, thereby indicating the site itself is being searched;

(e) lead to frequently-visited sites 118;

(f) lead to official sites 118 such as *.gov sites or *.org sites;

(g) lead to sites from which the user 102 copies data, e.g., by saving an image to disk or by "print screen", or by cut-and-paste copying of text;

(h) lead to sites 118 having other indicia of relevance.

Familiar testing and observation methods can also be used to identify correlations between keywords and sites turned up in a search using those keywords that end the search, thereby implying that they are productive. Larger samples may be better than smaller ones for some keywords, because searches end for a variety of reasons (e.g., searcher interrupted and had to do something else) in addition to ending when the searcher 112 finds what they're looking for. But with the invention, the last site/document visited, or one at which the searcher spends the most time, or one that the searcher 112 keeps returning to, can be identified 210 automatically by search assistants 120. Then it is inferred that such a site/document would be helpful to another user 102 who is performing a search using the same or related keywords. The search 116 keywords and/or the resulting site/document are then supplied 212 to the searcher 102.

Some of the criteria for identifying 210 related searches by other users include: testing for keywords that are lexically and/or semantically linked; testing whether a significant number of the same search results come up in two searches. In some embodiments, a "significant number" means at least a set percentage, e.g., at least 35% or 50% or 70%, while in some it means at least some threshold such as at least ten or a hundred or a thousand, or at least some number of the top ten percent such as at least five in the top twenty website results.

Keywords are "lexically linked" when they share a root, e.g., "search", "searching", "searcher", and "searches" are four lexically linked words. Automatic tests for lexical linkage can be programmed, e.g., using look-up tales of suffixes and/or by parsing dictionary entries.

Keywords are "semantically linked" when their meaning overlaps or is closely related, e.g., "search", "seek", "chercher", and "finding" are four semantically linked words. Automatic tests for semantic linkage can be implemented using semantic nets and other artificial intelligence techniques, or by using a thesaurus look-up, for example, including the possible use of an on-line thesaurus such as that found at website www dot lexfn dot com or at website www dot m-w dot com.

Although specific examples are given here, they are illustrative only, and the invention is not limited to search engines per se; to searches 106, 116 performed on the Internet or World Wide Web as opposed to other networks, machines, or data repositories 108; to monolingual searches 106, 116; or to text-based searches as opposed to searches 106, 116 of images or other non-textual data.

Subweb searching as illustrated in FIG. 2 may be implemented by making appropriate indexes of crawled pages, and then searching 106 only within those indexes. For instance, an index of pages searched in the last hour could be maintained, for each of the past 24 hours. Subweb searching may be implemented by modifying/supplementing existing indexes. For instance, a bit could be added to indicate whether a page contains embedded/linked-directly images. Subweb searching may be implemented as a filter on current search results, for instance, as discussed with use of the WayBack Machine. Other implementations that provide the functionality indicated here may also be apparent to those skilled in the art, particularly if they have experience implementing search engines as well as using them.

Conclusion

The steps and other characteristics described herein may be combined in various ways to form embodiments of the invention. In methods of the invention, steps may be omitted, repeated, renamed, supplemented, performed in serial or parallel, and/or grouped differently, except as required by the claims and to provide an operable embodiment. In particular, not every step illustrated in a given example need be performed in a given method according to the invention.

System embodiments generally use a computer device 104, 114 (computer, PDA, cell phone, or other device with inter-operating processor and memory) which is networked to a search service 122 to perform at least one of the methods described herein. Different system embodiments may omit, repeat, regroup, supplement, or rearrange the system components discussed, provided the system overall is operable and conforms to at least one claim. To the extent that hardware, software, and firmware implementations are deemed partially or fully interchangeable at the time in question by one of skill in the art, they may be utilized in embodying the invention even though the specific examples discussed here are implemented differently.

Although particular embodiments of the present invention are expressly described herein as methods or devices, it will be appreciated that discussion of one type of embodiment also generally extends to other embodiment types. For instance, the descriptions of search methods also help describe search systems. It does not follow that limitations from one embodiment are necessarily read into another.

Headings are for convenience only; information on a given topic may be found outside the section whose heading indicates that topic. All claims as filed are part of the specification and thus help describe the invention, and repeated claim language may be inserted outside the claims as needed.

It is to be understood that the above-referenced embodiments are illustrative of the application for the principles of the present invention. Numerous modifications and alternative embodiments can be devised without departing from the spirit and scope of the present invention. It will be apparent to those of ordinary skill in the art that numerous modifications can be made without departing from the principles and concepts of the invention as set forth in the claims.

As used herein, terms such as "a" and "the" and designations such as "search" and "searching" are inclusive of one or more of the indicated item or step. In particular, in the claims a reference to an item generally means at least one such item is present and a reference to a step means at least one instance of the step is performed.

The scope of the invention is indicated by the appended claims rather than being limited to the specific examples in the foregoing description and the Appendixes it incorporates. All changes which come within the meaning and range of equivalency of the claims are to be embraced within their scope to the full extent permitted by law.

I claim:

1. A method of assisting a search, comprising:
receiving an initial search of a user A;
from the initial search identifying at least one related productive search of at least one other user, wherein a search is identified as productive if the search ends at an official site; and
using the related productive search to focus a search by user A;
wherein a search is identified as related if the search includes at least one of the following:
a keyword search which has at least one keyword that is semantically linked to at least one keyword of the initial search;
a keyword search which has at least one keyword that is lexically linked to at least one keyword of the initial search;
a search result of the other user which has a significant number of the same search results as the initial search.

2. The method of claim 1, wherein the method comprises identifying a search as productive because the search led to a ".gov" official site.

3. The method of claim 1, wherein the method comprises identifying a search as productive because the search led to a ".org" official site.

4. The method of claim 1, wherein the search ends at an official site when a user copies data from it by at least one of the following: saving an image to disk, performing a print screen, cut-and-paste copying of text, printing.

5. The method of claim 1, wherein the search ends at an official site when a user makes a purchase there.

6. The method of claim 1, wherein the step of identifying at least one related productive search of at least one other user comprises tracking activity by the other user on a computer device of the other user.

7. A method of assisting a search, comprising:
receiving an initial search of a user A;
from the initial search identifying at least one related productive search of at least one other user, wherein a search is identified as productive if the search ends with a user scrolling to get to part of a search result document that was not initially displayed; and
using the related productive search to focus a search by user A;
wherein a search is identified as related if the search includes at least one of the following:
a keyword search which has at least one keyword that is semantically linked to at least one keyword of the initial search;
a keyword search which has at least one keyword that is lexically linked to at least one keyword of the initial search;
a search result of the other user which has a significant number of the same search results as the initial search.

8. The method of claim 7, wherein the user copies data after scrolling by at least one of the following: saving an image to disk, performing a print screen, cut-and-paste copying of text, printing.

9. The method of claim 7, wherein the user makes a purchase after scrolling.

10. The method of claim 7, wherein the step of identifying at least one related productive search of at least one other user comprises tracking activity by the other user on a computer device of the other user.

11. A method of assisting a search, comprising:
receiving an initial search of a user A;
from the initial search identifying at least one related productive search of at least one other user, wherein a search is identified as productive if the search ends with multiple browsers and/or other windows being spawned on a computer device by a user in a depth-first search by the user rooted at a search result document after the search result document is displayed to the user; and
using the related productive search to focus a search by user A;
wherein a search is identified as related if the search includes at least one of the following:
a keyword search which has at least one keyword that is semantically linked to at least one keyword of the initial search;
a keyword search which has at least one keyword that is lexically linked to at least one keyword of the initial search;
a search result of the other user which has a significant number of the same search results as the initial search.

12. The method of claim 11, wherein the user copies data from one of the spawned windows by at least one of the following: saving an image to disk, performing a print screen, cut-and-paste copying of text, printing.

13. The method of claim 11, wherein the user makes a purchase using one of the spawned windows.

14. The method of claim 11, wherein the step of identifying at least one related productive search of at least one other user comprises tracking activity by the other user on a computer device of the other user.

* * * * *